United States Patent
Wu et al.

(10) Patent No.: US 9,009,252 B2
(45) Date of Patent: *Apr. 14, 2015

(54) RULES-BASED TRANSACTIONS PREFETCHING USING CONNECTION END-POINT PROXIES

(75) Inventors: David Tze-Si Wu, Fremont, CA (US); Vivasvat Keswani, San Fransisco, CA (US); Case Larsen, Union City, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/894,681

(22) Filed: Sep. 30, 2010

(65) Prior Publication Data

US 2011/0238738 A1     Sep. 29, 2011

Related U.S. Application Data

(62) Division of application No. 11/273,861, filed on Nov. 14, 2005, now Pat. No. 7,853,699.

(60) Provisional application No. 60/662,452, filed on Mar. 15, 2005.

(51) Int. Cl.
    *G06F 15/16*     (2006.01)
    *H04L 29/08*     (2006.01)

(52) U.S. Cl.
    CPC ............ *H04L 67/1095* (2013.01); *H04L 67/10* (2013.01)

(58) Field of Classification Search
    USPC .................................. 709/203, 206, 217–231
    See application file for complete search history.

(56) References Cited

U.S. PATENT DOCUMENTS

| | | |
|---|---|---|
| 5,754,774 A | 5/1998 | Bittinger et al. |
| 5,926,834 A | 7/1999 | Carlson et al. |

(Continued)

FOREIGN PATENT DOCUMENTS

JP     2003-110604 A     4/2003

OTHER PUBLICATIONS

Amer, Ahmed et al., "File Access Prediction with Adjustable Accuracy," 2002, Proceedings of the Performance, Computing, and Communications Conference 2002, on 21st IEEE International, pp. 131-140.

(Continued)

*Primary Examiner* — Yasin Barqadle
(74) *Attorney, Agent, or Firm* — Park, Vaughan, Fleming & Dowler LLP

(57) ABSTRACT

Network proxies reduce server latency in response to series of requests from client applications. Network proxies intercept messages clients and a server. Intercepted client requests are compared with rules. When client requests match a rule, additional request messages are forwarded to the server on behalf of a client application. In response to the additional request messages, the server provides corresponding response messages. A network proxy intercepts and caches the response messages. Subsequent client requests are intercepted by the network application proxy and compared with the cached messages. If a cached response message corresponds with a client request message, the response message is returned to the client application immediately instead of re-requesting the same information from the server. A server-side network proxy can compare client requests with the rules and send additional request messages. The corresponding response messages can be forwarded to a client-side network proxy for caching.

17 Claims, 11 Drawing Sheets

(56) References Cited

U.S. PATENT DOCUMENTS

| | | | |
|---|---|---|---|
| 5,990,810 A | 11/1999 | Williams | |
| 6,085,193 A | 7/2000 | Malkin et al. | |
| 6,144,996 A * | 11/2000 | Starnes et al. | 709/217 |
| 6,173,318 B1 | 1/2001 | Jackson et al. | |
| 6,178,461 B1 | 1/2001 | Chan et al. | |
| 6,330,561 B1 | 12/2001 | Cohen et al. | |
| 6,415,329 B1 | 7/2002 | Gelman et al. | |
| 6,578,073 B1 * | 6/2003 | Starnes et al. | 709/219 |
| 6,742,043 B1 | 5/2004 | Moussa et al. | |
| 6,751,608 B1 | 6/2004 | Cohen et al. | |
| 6,874,017 B1 | 3/2005 | Inoue et al. | |
| 6,959,318 B1 | 10/2005 | Tso | |
| 7,092,370 B2 | 8/2006 | Jiang et al. | |
| 7,120,666 B2 | 10/2006 | McCanne et al. | |
| 7,230,949 B2 | 6/2007 | Bharali et al. | |
| 7,318,100 B2 | 1/2008 | Demmer et al. | |
| 7,336,682 B2 | 2/2008 | Singh | |
| 7,389,330 B2 * | 6/2008 | Dillon et al. | 709/219 |
| 7,650,416 B2 | 1/2010 | Wu et al. | |
| 2002/0023145 A1 * | 2/2002 | Orr et al. | 709/219 |
| 2002/0065899 A1 * | 5/2002 | Smith et al. | 709/214 |
| 2002/0092026 A1 | 7/2002 | Janniello et al. | |
| 2002/0103778 A1 | 8/2002 | Saxena | |
| 2003/0212739 A1 | 11/2003 | Boucher et al. | |
| 2004/0215717 A1 | 10/2004 | Seifert et al. | |
| 2004/0215746 A1 | 10/2004 | McCanne et al. | |
| 2005/0044242 A1 | 2/2005 | Stevens et al. | |
| 2005/0060426 A1 | 3/2005 | Samuels et al. | |
| 2005/0234643 A1 | 10/2005 | Abraham et al. | |
| 2006/0010442 A1 | 1/2006 | Desai et al. | |

OTHER PUBLICATIONS

Caceres, Ramon et al., "Web Proxy Caching: The Devil Is In The Details," Jun. 1998, Proceedings of the Workshop on Internet Server Performance, Madison, Wisconsin, pp. 111-118.

Deshpande, Mukund et al., "Selective Markov Models for Predicting Web-Page Accesses," 2004, ACM Transactions on Internet Technology, vol. 4, Issue 2, pp. 163-184.

Fan, Li et al., "Summary Cache: A Scalable Wide-Area Web Cache Sharing Protocol," Jun. 2000, Proceedings of the IEEE/ACM Transactions on Networking, vol. 8, No. 3, pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, Proceedings of the IEEE Workshop on Advances in Parallel and Distributed Systems, Technical Report # CS243-93, pp. 8-12.

Griffioen, James et al., "Reducing File System Latency Using a Predictive Approach," Jun. 1994, Proceedings of the USENIX Summer 1994 Technical Conference on USENIX, Technical Conference, vol. 1.

Lei, Hui et al., "An Analytical Approach to File Prefetching," Jan. 1997, Proceedings of the Annual Conference on USENIX Annual Technical Conference, Anaheim, California, pp. 1-12.

Oly, James et al., "Markov Model Prediction of I/O Requests for Scientific Applications," Jun. 2002, Proceedings of the 16th International Conference on Supercomputing, pp. 147-155.

Padmanabhan et al., "Using Predictive Prefetching to Improve World Wide Web Latency," ACM SIGCOMM, Computer Communication Review, pp. 22-36.

Rhea, Sean C. et al., "Value-Based Web Caching," May 2003, Proceedings of the 12th International Conference on World Wide Web, Budapest, Hungary, pp. 619-628.

Tolia, Niraj, et al., "An Architecture for Internet Data Transfer", May 2006, Third Symposium on Networked Systems Design and Implementation (NSDI'06), San Jose, California.

Yang, Qiang et al., "Mining Web Logs for Prediction Models in WWW Caching and Prefetching," Aug. 2001, Proceedings of the Seventh ACM SIGKDD International Conference on Knowledge Discovery and Data Mining KDD'01, San Francisco, California, pp. 473-478.

China State Intellectual Property Office (SIPO) office action for SIPO patent application200680012893.5 (Nov. 8, 2010).

Examination Report for Australian patent application 2006222887 (Sep. 30, 2010).

Border et al. "Performance Enhancing Proxies Intended to Mitigate Link-Related Degradations," Network Working Group Request for Comments: 3135 (Jun. 2001).

Mogul et al. "Delta encoding in HTTP," Network Working Group Internet-Draft (Oct. 2001).

* cited by examiner

610
```
<sql_rpc_rule
  rule_id="1"
  app_name_regex="Microsoft(R) Project for Windows(TM)"
  rpc_id="5"
  rpc_name_regex=""
  num_params="7"
  rpc_query_regex=".*where\\s+proj_name   =  '([^']*)'"
  cursor_type="forward-only"
/>
```

620
```
<sql_rpc_action
  rule_id="1"
  action_id="1"
  num_reps="1"
  invalidate="PM_TEARDOWN"
  allow_prefetch="true"
  allow_preack="true"
/>
```

630
```
<sql_rpc_arg_action
  rule_id="1"
  action_id="1"
  arg_offset="0"
  expr="replace select proj_read_count , proj_locked, proj_read_write, proj_read_only, proj_id, proj_machine_id, proj_data_source from msp_projects where proj_name = '$1'"
/>
```

FIG. 6

RULES-BASED TRANSACTIONS PREFETCHING USING CONNECTION END-POINT PROXIES

CROSS-REFERENCES TO RELATED APPLICATIONS

This application is a divisional of U.S. application Ser. No. 11/273,861, filed Nov. 14, 2005, and claims priority to U.S. Provisional Patent Application No. 60/662,452, filed Mar. 15, 2005, the disclosures which are incorporated herein by reference in their entirety for all purposes. This application is related to and incorporates by reference for all purposes U.S. Pat. No. 7,120,666, issued Oct. 10, 2006, U.S. patent application Ser. No. 10/640,405, filed Aug. 12, 2003, U.S. Pat. No. 7,318,100, issued Jan. 8, 2008, and U.S. Pat. No. 7,650,416, issued Jan. 19, 2010.

BACKGROUND OF THE INVENTION

The present invention relates generally to accelerating client-server transactions across a network. Many typical computer applications use the request-response based messaging scheme for client-server interaction. In this scheme, the client issues a request and then waits for a response from the server before issuing the next request. In certain cases, the server may initiate a request or 'callback' message to the client.

A transaction initiated by the client consists of one or more request-response message pairs. When the client and server end-points are separate entities communicating over a network channel, the latency characteristics of the network channel play an important role in the overall transaction time. Typically, Wide Area Networks (WANs) have a larger round-trip-time (RTT) compared to Local Area Networks (LANs). Consequently, it takes a longer time from when a client issues a request to when it receives a response from the server. Furthermore, for transactions including multiple request-response message pairs, because the client issues the next request only after receiving a response to the prior one, the overall transaction time increases due to a larger round-trip-time.

In the case of high latency WANs, overall transaction time can be reduced by modifying the manner in which the transactions are executed by the client. If two requests are independent of each other, the client does not need to wait for the receipt of a response to a first outstanding request before issuing the next request. Generally, there are at least two forms of independence: data independence and timing independence. A pair of requests are data-independent if the contents of the second request are the same regardless of the response message received from the first request. A pair of requests are timing-independent of each other if the second request can be issued without positive acknowledgement of the first request by the server (usually conveyed by the response message). All timing-independent requests are also data-independent, but not vice-versa. Two or more independent request messages may be issued simultaneously or in quick succession by a client, reducing overall time taken to reduce the transaction. However this method is not feasible in all cases as requests are often inter-dependent.

Even in cases where such improvements are possible and independent transactions can be identified, client applications often cannot be easily modified. The source code may be unavailable for legal or commercial reasons; changes to the source code may not be allowed for supportability reasons; or people with the skills needed to change the client application may not be available.

It is therefore desirable for a system and method to decrease the time of client-server transactions without the need to modify applications.

BRIEF SUMMARY OF THE INVENTION

In an embodiment of the invention, network application proxies may be used to improve the speed of client-server transactions without modifying client applications. In particular, the network application proxies can be used to reduce server latency in response to series of requests from client applications. A network application proxy is used at either the client- and/or server-end to intercept the network connection made between a client and a server. Client requests intercepted by a network application proxy are compared with a set of rules. When client requests match one or more rules, additional messages, referred to a prefetch requests, are forwarded to the server on behalf of a client application. In an embodiment, the rules are defined according to the specific applications on the system.

In response to one or more prefetch messages sent to the server, the server can provide corresponding response messages. The network application proxy intercepts the response messages and caches responses corresponding to prefetch messages. As subsequent client requests are intercepted by the network application proxy, they are compared with the cached prefetch messages. If a client request matches a cached prefetch message, the associated result messages is returned to the client application immediately instead of re-requesting the same information from the server.

In a further embodiment, this functionality is implemented with both client-side and server-side network proxies. A server-side network proxy can compare client requests with the set of rules, create prefetch messages, and receive response messages to prefetch messages. The server-side network proxy can then forward data including the response messages to a client side network proxy for caching. The client-side network proxy intercepts further client requests and compares them with the locally-cached prefetch messages. If the client request matches a cached prefetch message, the client-side proxy can return the associated result messages to the client application immediately. Conversely, if the client request does not match a cached prefetch message, the client-side proxy can forward the client request to the server-side proxy for comparison with the set of rules and eventual processing by the server.

In yet a further embodiment, if the client issues a request message other than the ones pre-issued and cached, the client proxy forwards the out-of-order request message to the server-side proxy. On receipt of this message, an embodiment of the server-side proxy determines whether the message invalidates all the previously fetched responses, does not affect them at all, or results in an unrecoverable transaction failure. If all previously-fetched messages need to be invalidated, the server-side proxy relays that decision to the client-side proxy, which purges all or part of its cache. If the out-of-order message results in an unrecoverable transaction failure, the server-side proxy closes its connection to the server as well as to its peer client-side proxy, and the client-side proxy is forced to return an error to the client node.

Some server applications support asynchronous client notifications wherein a message is sent by the server to client when a certain condition arises. The notifications may serve as callbacks to the client to ensure consistency of state information shared by one or more client nodes and/or server nodes. For example, if the server functions as a database server and numerous clients access a database, a client may be interested in receiving a notification when another client modifies a certain database entry it has recorded from a previous read transaction with the server. To ensure consistency, an embodiment of the client updates or erases the database entry previously recorded. In order to maintain this consistency when network level application proxies are used, the proxies should know when to invalidate or update pre-fetched responses when such callbacks occur. Rules determine the action which is taken when a server originating callback message matches a specified regular expression. Typically, the action is to purge pre-fetched responses at the client-side proxy.

In an embodiment, user-specified rules accurately specify the criteria used for deciding which client- or server-generated request is a match. In addition, the rule specifies the appropriate action that should be taken when a match occurs. The criteria used for determining matches depend on the structure of the request/response messages. For illustration purposes, consider a database application server being accessed by a client using clear text queries and/or remote procedure calls (RPCs), such as those encoded in the Tabular Data Stream (TDS) protocol implemented by Sybase, Microsoft, and programs available at www.freetds.org. In this example, a user specifies regular expressions for an exact or partial text match in the case of clear text queries. For RPC messages, simple text based regular expression matching does not suffice as the request message may consist of non-text based encodings (e.g. binary encoding) for the RPC name, identifier, arguments, parameters, etc. Therefore, the application proxies must decode the encoded RPC message components and present it to the user in clear text (or character format) so that the matching is done as per a combination of one or more of the following: RPC name, RPC identifier, number of RPC parameters, parameter name(s), parameter type(s), parameter type(s) or argument value(s).

In an embodiment, user-specified actions determine how many pre-fetched requests are generated when a query or RPC message matches a user-specified rule. The first pre-fetched request is obtained by cloning the original rule-triggering message and then modifying it. For plain text based query messages, the modification could be a regular expression substitution operation. For RPC based messages, the user action specifies RPC name or identifier changes via regular expression substitutions. For RPC arguments, the user action specifies the argument using its offset in the list and specifies a modification using a regular expression. Subsequent pre-fetched request messages are either cloned off the rule-triggering message or the previous pre-fetched message.

It is possible that the user-specified rules generate a large number of pre-fetched requests at the server-side proxy. Such a situation may result in taxing the server node's resources, or excessive delays when the client node issues a request message that is not already cached by the proxies. In an embodiment, two schemes can be used to avoid this problem: a) A user-specified limit controls the number of outstanding pre-fetched requests issued by the server end proxy to the server b) a feedback mechanism between the proxies determines when pre-fetching is resumed. The feedback mechanism entails having the client-side proxy send a positive acknowledgement back to the server-side when the client node requests a request message whose response has already been pre-fetched and stored at the client. If the client requests messages other than those that have been already been fetched, the feedback mechanism prevents the server-side proxy from issuing new requests. On the other hand, if the pre-fetched responses are sent to the client, the positive feedback results in the server-side proxy pre-fetching more responses from the server.

BRIEF DESCRIPTION OF THE DRAWINGS

The invention will be described with reference to the drawings, in which:

FIG. 6 shows examples of rules in the rule store of the server-side proxy suitable for use with an embodiment of the invention.

DETAILED DESCRIPTION OF THE INVENTION

Figure 1:
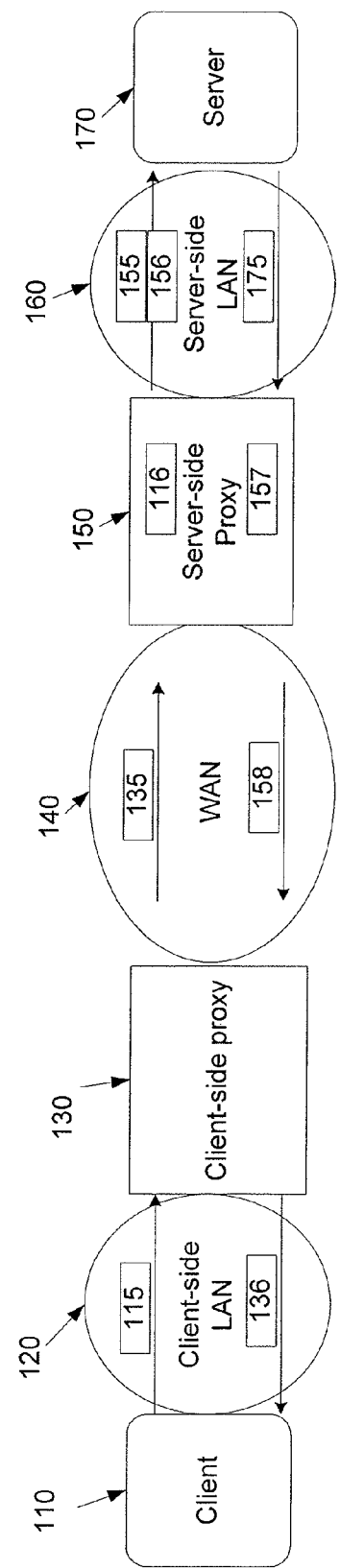
FIG. 1 shows an example arrangement of client, server, proxies, and interconnecting networks suitable for use with embodiment of the invention.

FIG. 1 shows a system 100 for accelerated transactions between client 110 and server 170 according to an embodiment of the invention. In the figure, client 110 and client-side network proxy 130 are both attached to a client-side network 120, typically a local-area network or LAN. Likewise, server 170 and server-side network proxy 150 are both attached to a server-side network 160. Client-side network 120 and server-side network 160 are both connected via WAN 140, possibly via additional routing, switching, or bridging devices and links not shown in FIG. 1. WAN 140 may consist of a variety of networks or internets capable of carrying data messages, including virtual private networking protocols.

Request 115 from client 110 is sent via client-side network proxy 130, which may answer it with matching cached pre-fetched response 136. If client-side network proxy 130 has no matching cached pre-fetched response, client-side network proxy 110 optimizes or transforms request 115 and sends it as optimized request 135 to server-side network proxy 150 on the other side of wide-area network WAN 140. Server-side network proxy 150 is the counterpart to client-side network proxy 130 and applies reverse optimization or transformation to received optimized request 135, producing original request 116. Server-side network proxy 150 checks for rules matching original request 116; if one or more rules fire and prefetching has not been throttled, the fired rules transform or replace original request 116 into new requests 155, 156. If no rules fire or prefetching has been throttled, original request 116 is forwarded to server 170.

Response 175 from server 170 to client 110 travels the reverse path. It is sent via server-side proxy 150, which determines whether additional actions must be taken such as updating or invalidating cached information at client-side network proxy 130, thereby potentially extending or replacing response 175 with response 157. Server-side network proxy 170 optimizes or transforms modified response 157 and sends it as optimized response 158 across WAN 140 to client-side network proxy 130. Client-side network proxy 130 is the counterpart to server-side network proxy 170 and applies reverse optimization or transformation to received optimized request 158, producing original modified response 157. Client-side network proxy processes modified response 157 by updating or invalidating its local caches as necessary. If modified response 157 included a direct (non-prefetched) response, that direct response 136 is sent to client 110.

Figure 2:
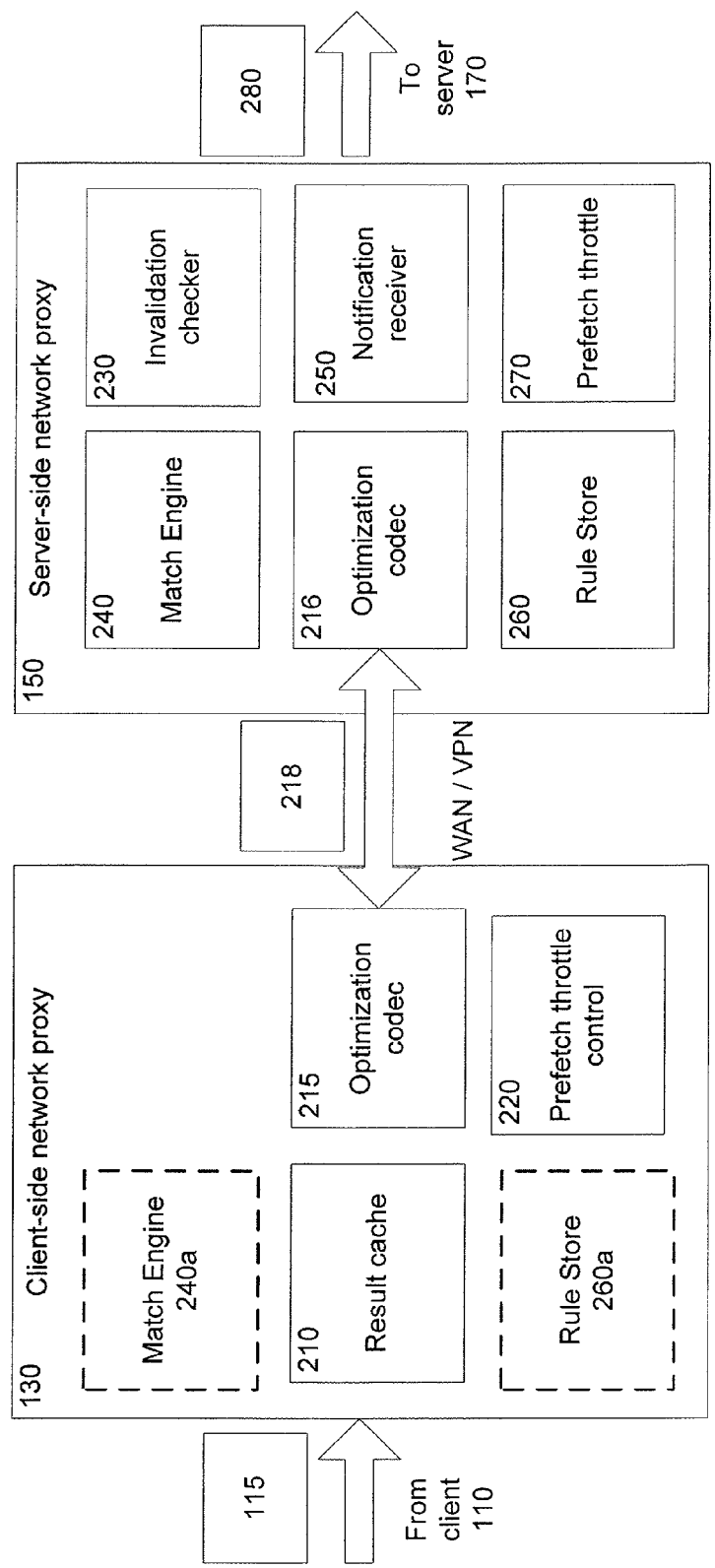
FIG. 2 shows the internal organization of the client-side proxy and server-side proxy according to an embodiment of the invention.

FIG. 2 shows the internal elements of client-side network proxy 130 and server-side network proxy 150 according to an embodiment of the invention. Client-side network proxy 130 includes result cache 210, optimization codec 215, and prefetch throttle control 220. Server-side network proxy 150 includes optimization codec 216, invalidation checker 230, match engine 240, notification receiver 250, rule store 260, and prefetch throttle 270.

When a request message 115 is received from client 110 by client-side network proxy 130, the request message 115 is compared to the contents of the result cache 210. In an embodiment, the result cache 210 is a table or other data structure including prefetched client requests and corresponding responses from the server 170. If the result cache 210 contains a result that matches request 115, that matching result is returned to client 110 and request 115 is not sent on to the server-side proxy 150.

As discussed in detail below, an embodiment of client-side proxy 130 can include a prefetch throttle control 220 to prevent data from prefetched requests from overwhelming the WAN connection 218 to the client 110, thereby blocking or delaying data explicitly requested by the client 110 from the server 170. In these embodiments, if the prefetch throttle control 220 indicates that prefetching has been throttled at the server-side proxy 150, the use of a result from result cache 210 causes the client-side network proxy 130 to send an "unthrottle" message to prefetch throttle 270 at server-side network proxy 150. Upon receiving an "unthrottle" message, the prefetch throttle 270 will allow the server-side network proxy 150 to resume prefetching data for the client 110.

If there is no matching result in result cache 210, the request message 115 is passed to the optimization codec 215, which applies optimizations and transformations such as those described in patent applications McCanne I, McCanne III, McCanne IV, and McCanne V. Optimized messages 218 flow from the client-side optimization codec 215 to the server-side optimization codec 216, and such optimized messages 218 need not correspond exactly to the original request messages 115, in number or in size.

At server-side network proxy 150, the server-side optimization codec 216 undoes the optimizations and transformations applied by the client-side optimization codec 215, recovering original request message 115. Invalidation checker 230 examines request message 115 to determine whether request 115 invalidates prefetched and cached information in the result cache 210. If so, the invalidation checker 230 sends an invalidation message to the client-side network proxy 130. If the invalidation checker 230 determines that request 115 cannot be executed, the invalidation checker 230 sends a fatal error message to client-side network proxy 130.

If the invalidation checker 230 detects no fatal error, the message 115 is passed to match engine 240. Match engine 240 compares message 115 to the contents of rule store 260 and determines which rules "fire" or are activated from the rules in rule store 260. When a rule fires, its defined effects take place, potentially producing a new message 280 to be sent to server 170. Rules can be stateless or stateful.

Match engine 240 and rule store 260 determine whether any rules fire, whether multiple rules can fire, and in what order rules fire. Rules may allow other rules to be enabled or disabled. In an embodiment, a convergence property or time-limit property is enforced by match engine 240 and rule store 260 to ensure that there are no endless cycles of rule firings. One such arrangement is to disable each rule after it fires and not allow it to be re-enabled until a new message is received. This arrangement ensures that there is a monotonically decreasing set of applicable rules. Another such arrangement is to have a limit counter for rules that is decremented after each firing. Another such arrangement is to have a real-time counter that decrements with the passage of time.

As discussed in detail below, an embodiment of the rule store 260 specifies each rule using at least a rule element and an action element. A rule element specifies criteria for matching with client requests. In an embodiment, the rule element can include wildcard characters, which can substitute for another character or characters in a client request. In further embodiments, rule elements can include regular expressions, which in conjunction with corresponding syntax rules, enable a rule element to specify more complicated sets of matching client requests without actually listing every possible element of the set.

In a further embodiment, match engine 240 and rule store 260 can be configured to utilize context sensitive grammars to activate rules. In this embodiment, the match engine 240 uses an analysis of the contents of two or more messages to determine whether to activate a rule. For example, a context sensitive grammar might not activate a rule in response to a first message until one or more additional messages satisfying criteria are received. In another example, a rule activation in response to a message might be supressed based on the contents of one or more previous messages.

An action element describes an action to be taken for a received message that matches the corresponding rule element. In an embodiment, an action element can specify the format of one or more additional messages to be sent to the server 170 on behalf of the client associated with the matching client request. Action elements can specify an exact prefetch message and/or a template for a prefetch message. In the latter case, the template can be completed using attributes of the client request or other system attributes to form a complete prefetch message.

Additional embodiments of the invention can include a throttling system to prevent data from prefetched requests from overwhelming the WAN connection 218 to the client 110, thereby blocking or delaying data explicitly requested by the client 110 from the server 170. In these embodiments, the operation of match engine 240 and rule store 260 may also be inhibited by prefetch throttle 270. Any new message 280 that is not identical to the received request 115 is considered a prefetch request and the generation of these messages may be limited by the prefetch throttle 270. The prefetch throttle 270 tracks the generation of prefetch messages 280 and inhibits the generation of such messages by rule firings (throttles the prefetching) when the number of generated messages reaches a configurable limit. In additional embodiments, the prefetch throttle 270 can limit the number of generated messages according to the total size of the data returned by one or more prefetch messages 280, the total number of network packets used for prefetch messages and their responses, the amount of time spent on prefetch messages and their responses, or any other individual or aggregate attributes of one or more prefetch messages and their responses. In a further embodiment, at the point where this throttling occurs, a message is also sent to the prefetch throttle control 220 at client-side proxy 130, indicating that prefetching has been throttled. After throttling is in place, prefetching will not resume until either a result is used from the result cache 210 at client-side proxy 130 (as described earlier) or the result cache 210 is invalidated by the decision of the invalidation checker 230.

A result that corresponds to a received request 115 is sent back through the paired optimization codecs 216, 215 to the client-side proxy 130, which in an embodiment forwards the unchanged result to client 110. A result that corresponds to a prefetch message 280 is marked accordingly and sent through the paired optimization codecs 216, 215 to the client-side proxy 130, which adds the result to the result cache 210 and sends nothing to the client 110.

In a further embodiment, two or more prefetch messages and their corresponding response messages that are associated with a client request are bundled or packaged together before being forwarded back to the client-side proxy. For example, the server-side proxy can attempt to bundle as many prefetch messages and corresponding response messages as possible into a single network packet. Once the data size limit of a packet has been reached for a bundle of messages or a time limit expires, the server-side proxy forwards the packet potentially containing multiple messages to the client-side proxy. The server-side proxy will repeat this bundling for any remaining messages. This has the effect of minimizing the number of network packets required to communicate prefetch messages and their corresponding responses with the client-side proxy, thereby improving network performance.

In some circumstances, a "result" message will come from the server as a notification, i.e. without any corresponding request initiating it. Among other uses, such notifications are often used to indicate changed circumstances of particular shared data items to clients that are likely to have an interest in those items. Such notifications are received at server-side proxy 150 by the notification receiver 250. Much like the invalidation checker 230, the notification receiver 250 analyzes the received notification to determine whether the received notification invalidates prefetched and cached information in the result cache 210. If so, the notification receiver 250 sends an invalidation message to the client-side network proxy 130. The notification receiver 250 may also determine that the notification indicates that an unfixable problem has occurred, and send a fatal error message to client-side network proxy 130.

Figure 3A:
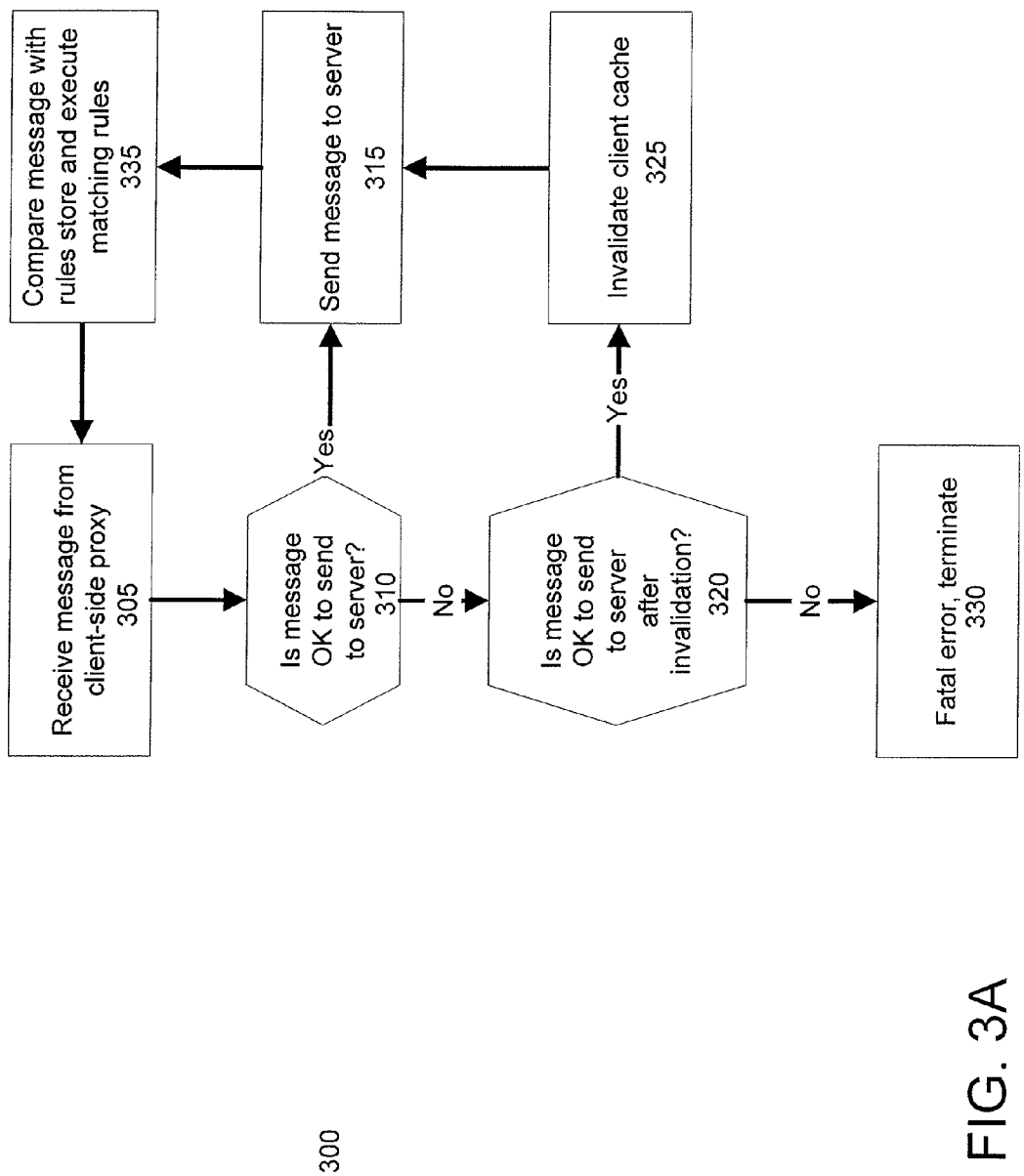
FIGS. 3A-3B show a method of processing messages received from the client-side proxy according to an embodiment of the invention.
Figure 3B:
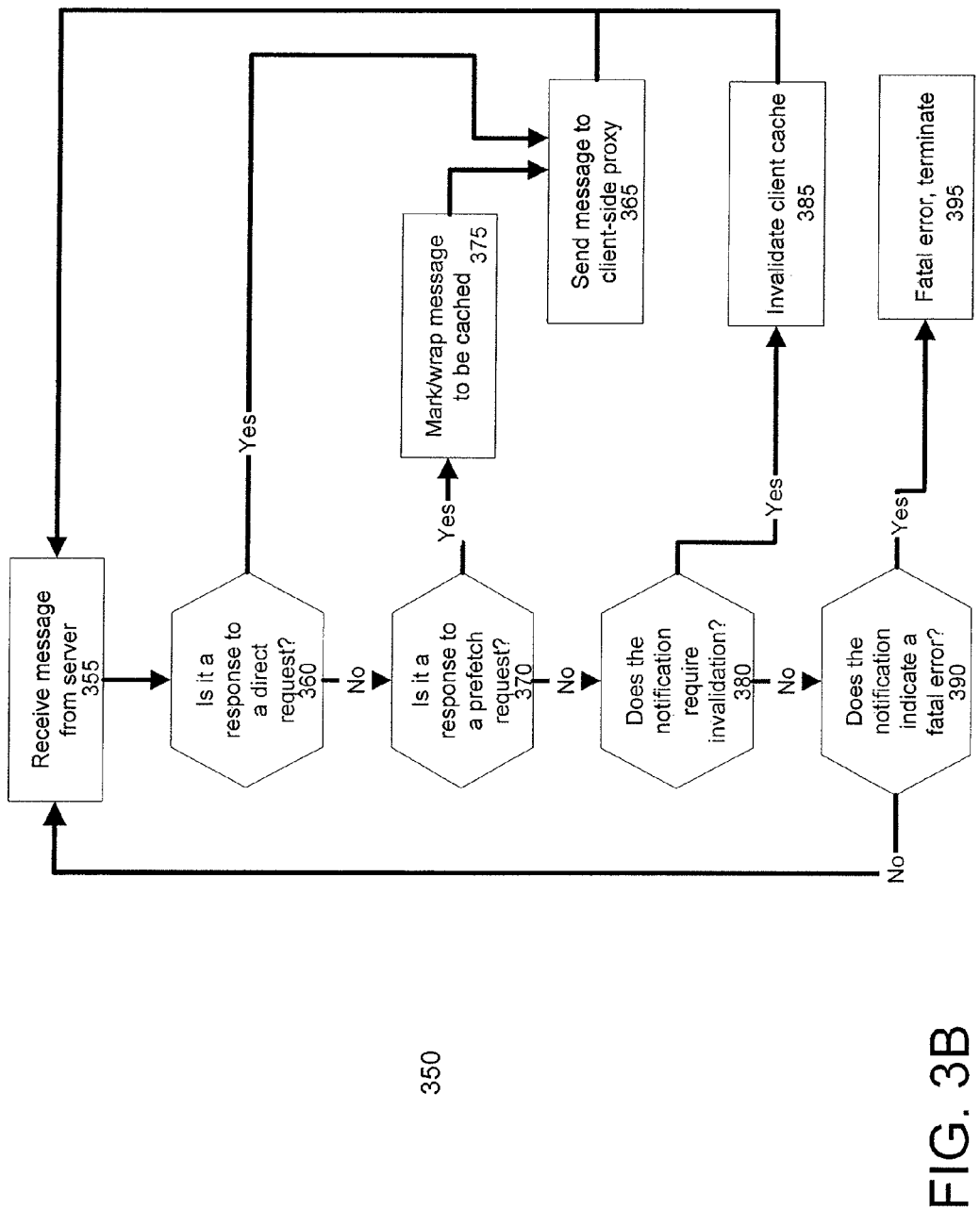

FIGS. 3A and 3B illustrate methods of processing data at a server-side network proxy according to an embodiment of the invention. FIG. 3A illustrates method 300 for processing messages received from the client via a client-side proxy according to an embodiment of the invention. At step 305, the server-side proxy receives a client request message intended for a server from a client application. In an embodiment, the client request message pass through a client-side proxy, which determines whether the client request message can be satisfied using data in the results cache. If not, the client-side proxy forwards the client request message to the server-side proxy.

Step 310 determines if the client request message can be forwarded to the server without introducing errors. In an embodiment, a client request message cannot be sent to the server if the client request is inconsistent with a prefetched message already issued by the server-side proxy. This can occur if the rule set used by the server-side proxy has failed to correctly predict one or more related client request messages in a series. Another reason a client request message may not be sent to the server is if the client request message would create an unrecoverable transaction error, for example due to an out-of-order client message request or an unexpected client message request.

If the client request message can be safely sent to the server, method 300 proceeds to step 315. Conversely, if the client request message cannot be safely sent to the server, method 300 proceeds to step 320. Step 320 determines if invalidating the results cache or a portion thereof, such as the portion of the cache storing the prefetch messages expected by the system instead of the client request message received in step 305, would make it safe to send the client request message to the server. If so, method 300 proceeds to step 325 to invalidate all or a portion of the results cache of the client-side proxy. In an embodiment, step 325 sends a message to the appropriate client-side proxy specifying that all or a portion of the results cache should be invalidated and the associated data discarded. Method 300 then proceeds from step 325 to step 315.

In an embodiment, the server-side proxy issues a cache invalidation policy, such as total or rule-based partial, to the client-side proxy when a client request message matches a rule at the server-side proxy. As discussed below, the client-side proxy uses this cache invalidation policy when a cache miss occurs to determine whether all or a portion of the client-side proxy's cache should be invalidated.

If step 320 determines that the client request message cannot be sent to the server safely even if the client-side proxy results cache is invalidated, then step 330 terminates the client request message. This can occur for example if an out-of-order client request message results in an unrecoverable transaction failure. In an embodiment of step 330, the server-side proxy closes its connection to the server as well as to its peer client-side proxy, and the client-side proxy is forced to return an error to the client application.

Following either step 310 or step 325, step 315 forwards the client request message to the intended server for processing. In an embodiment, the server-side proxy maintains a record of the client request message so as to match it with any result messages returned by the server.

Following step 315, step 335 compares the client request message with the set of rules maintained by the server-side proxy. In an embodiment, step 335 issues one or more prefetch messages to the server on behalf of the client application in response to the client request message matching one or more of the rules. Prefetch messages can be issued simultaneously or sequentially. In an embodiment, the server-side proxy maintains a record of the prefetch messages sent to the server in conjunction with a client request message. In a further embodiment, step 335 may be disabled using the traffic throttling system discussed above. Following step 335, method 300 returns to step 305 to await further messages from the client-side proxy.

FIG. 3B illustrates method 350 for processing messages received from the server. In alternate embodiments, these steps may be executed in a different order, as there is no necessary synchronization or sequencing except where explicitly indicated. Step 355 receives a message from the server. Step 360 determines if the message received is server response to a client request message previously received by the server-side proxy. If so, method 350 proceeds to step 365. In an embodiment, this comparison can be facilitated by a record of client request messages maintained by the server-side proxy.

Conversely, if step 360 determines that the message received is not server response to a client request message previously received by the server-side proxy, step 370 determines if the message received is a server response to a prefetch message sent by the server-side proxy on behalf of a client application in response to a client request message matching one or more rules. If so, method 350 proceeds to step 375. In an embodiment, this comparison can be facilitated by a record of prefetch messages maintained by the server-side proxy.

Step 375 marks and wraps the message. In an embodiment, the message is wrapped with additional data to facilitate caching by the client-side proxy. In an embodiment, this additional data can include a copy of the corresponding prefetch request or an identifier derived therefrom. This enables the client-side proxy to match future client requests with data stored in the results cache. Following step 375, method 350 proceeds to step 365.

Following step 375 or step 360, step 365 sends the message or, as discussed below and elsewhere, a bundle of messages to the client-side proxy.

In a further embodiment, step 375 can bundle multiple messages together in a network packet to improve network performance. In this embodiment, following step 375, step 365 may be bypassed if the packet is not full. In this case, method 350 then proceeds directly to step 355 to await the next message from the server. In a further embodiment, if another message from the server and associated with a partially filled packet has not be received within a time period, method 350 will return to step 365 to send any partially filled packets to the appropriate client-side proxies.

Returning to step 370, if the message received is not a server response to a prefetch message, method 350 proceeds to step 380. Step 380 determines if the received message invalidates the data in the results cache of the client-side proxy. If so, then method 350 proceeds to step 385 to invalidate the results cache of a client-side proxy. In an embodiment, step 385 sends a message to the client-side proxy providing a cache invalidation policy. In response to a cache miss, which occurs when a client request does not match any data in the cache, the client-side proxy discards all or a portion of its results cache according to the cache invalidation policy. The cache invalidation policy may specify that the all the data in the results cache is to be discarded or that only data matching a rule is to be discarded.

In an embodiment, the server-side proxy directly invalidates all or a portion of the results cache of a client-side proxy. For example, this can be done using a pair of proxy rules: Rule A and Rule B. Rule A consists of query matching criteria, prefetch directives and a cache miss policy of "forward misses without cache flush to the server". Rule B consists of matching criteria and an active cache flush (partial or total) directive. The active cache flush message is sent to the client-side proxy, causing the client side proxy to flush the cache.

This pair of rules can be used for the case where the server side proxy prefetches a large list of queries and sends them over to the client side proxy using Rule A. The client requests only a subset of these prefetched queries interspersed with client request messages that are cache misses at the client side proxy. At some point, the client may issue a specific client request message that results in a cache miss at the client. Like other client request messages that cause a cache miss, this specific client request message is forwarded to the server-side proxy to be fulfilled. At the server-side proxy, this client request message matches rule B. The criteria of rule B is specified such that it matches client request messages that indicate that the client will not be requesting any more of the remaining prefetched requests stored in the results cache of the client-side proxy. As a result of the client request message matching rule B, the server-side proxy sends a message to the client-side proxy that purges part or whole of the results cache of the client side proxy.

Conversely, if the message received does not require the results cache to be invalidated, method 350 proceeds to step 390. Step 390 determines if the message indicates a fatal error. If so, method 350 proceeds to step 395, which terminates the method. Otherwise, method 350 proceeds from step 390 back to step 355 to await further messages.

Figure 4A:
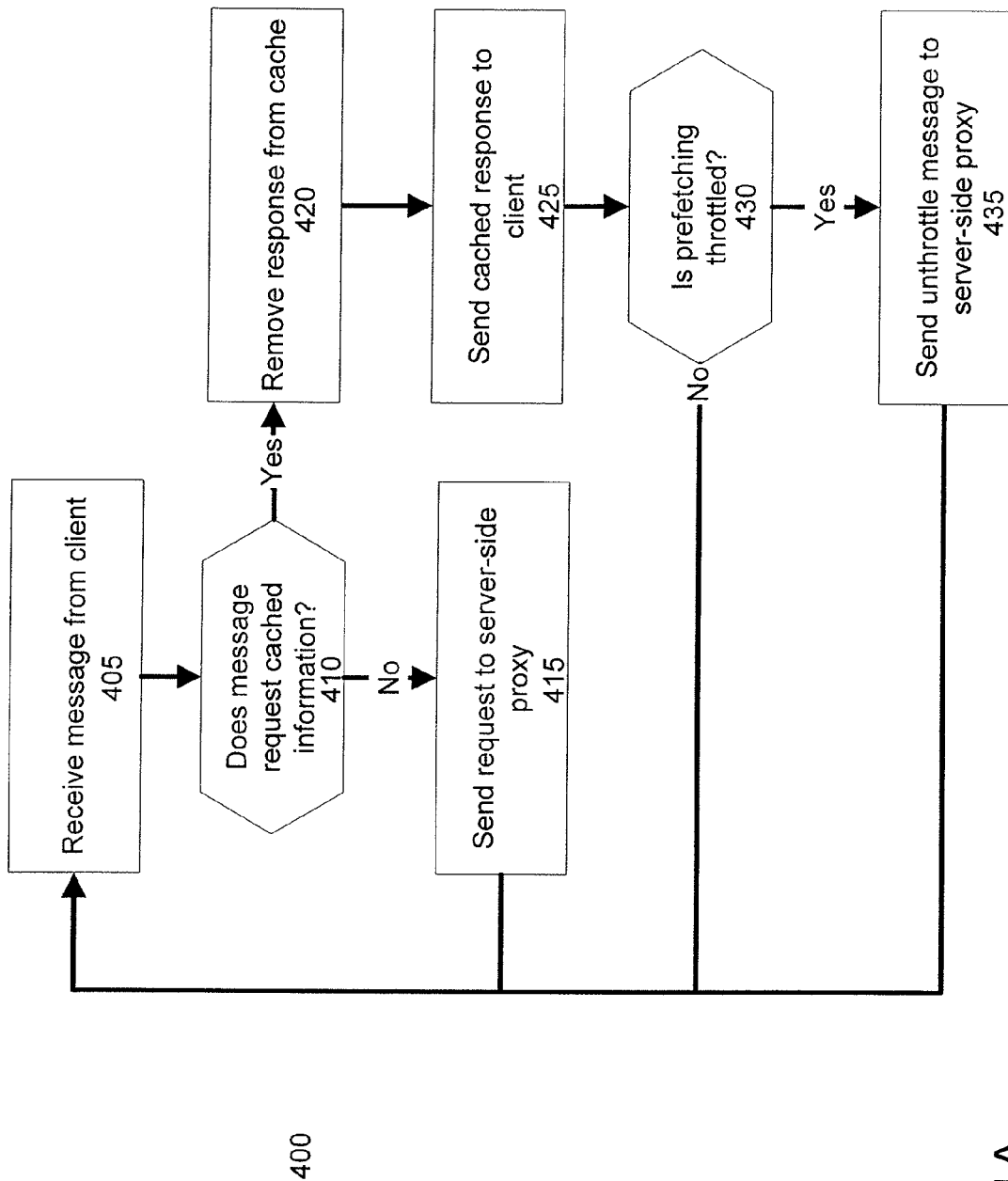
FIGS. 4A-4B show a method of processing messages received from the server-side proxy according to an embodiment of the invention.

FIG. 4 illustrate methods of processing data at the client-side network proxy according to an embodiment of the invention. FIG. 4A illustrates method 400 for processing messages received from a client. Step 405 receives a client request message from a client application. Step 410 determines if the client request message matches data stored in the results cache of the client-side network proxy. In an embodiment, the results cache stores prefetch messages and their corresponding result messages. In this embodiment, step 410 searches the results cache for a prefetch message matching the received client request message. In further embodiments, techniques such as hash tables can be used to facilitate searching the results cache for results messages matching the received client request message.

If step 410 determines that the results cache does not include any data corresponding with the received client request message, step 415 forwards the received client request message to the server for processing. In an embodiment, step 415 forwards the received client request message to a server-side proxy to be processed as described above. Method 400 then returns to step 405 to await further client request messages.

Conversely, if step 410 determines that the results cache does include one or more result messages corresponding with the received client request message, then step 420 removes the corresponding result messages from the results cache. Step 425 forwards the result messages to the client application, thereby satisfying the client request message without the need to initiate further communications with the server.

In an embodiment, the client-side network proxy can include a prefetch throttle control. In this embodiment, step 430 determines if network traffic including data associated with additional prefetch messages and corresponding result messages is throttled, or suspended, from the server-side network proxy. If so, then step 435 sends an "unthrottle" communication to the server-side network proxy to indicate that the server-side network proxy can resume sending data associated with any additional prefetch messages and corresponding result messages to the client-side proxy. If not, then method 400 returns to step 405 to wait for additional client request messages from the client application. Similarly, following step 440, method 400 returns to step 405.

Figure 4B:
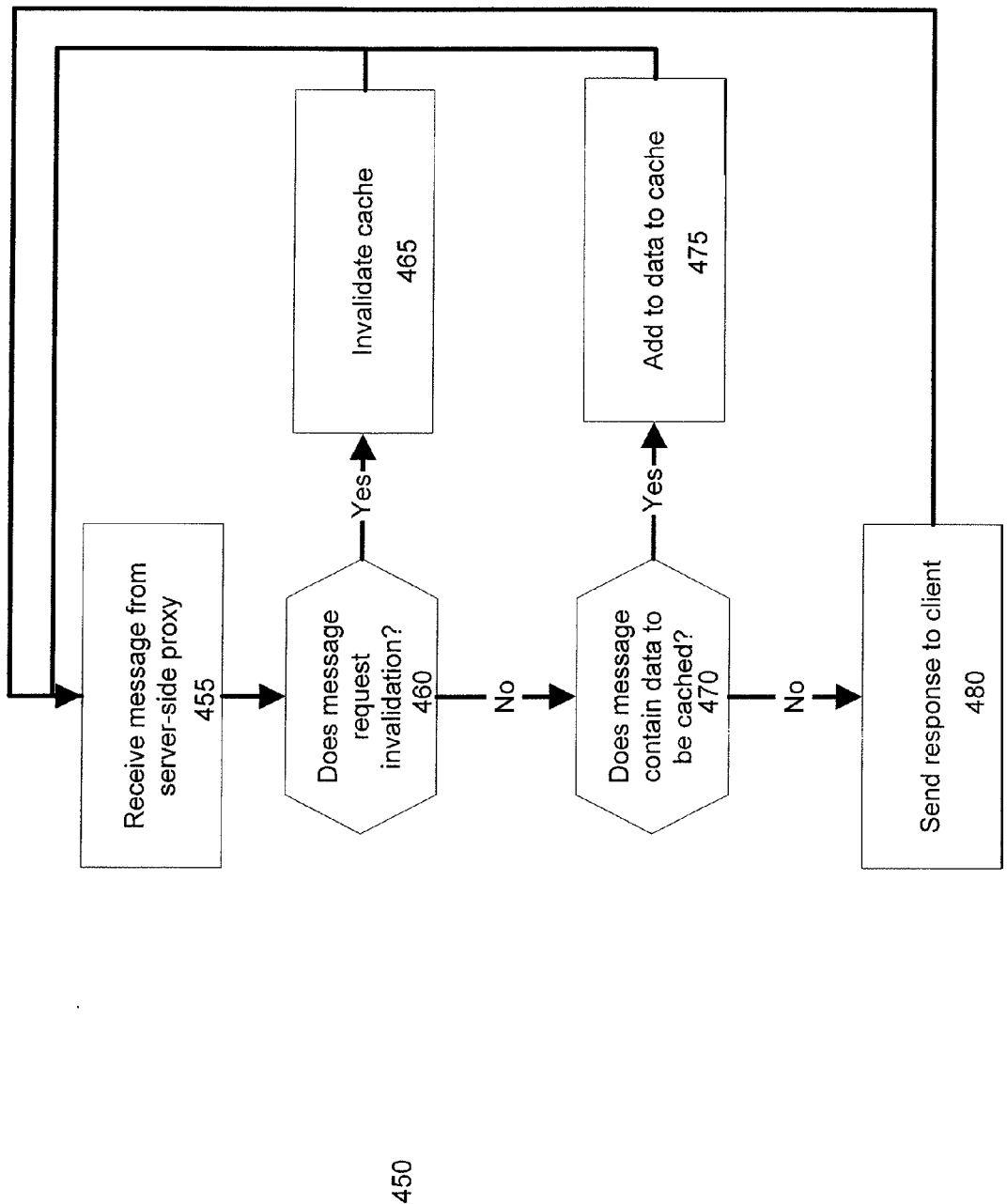

FIG. 4B illustrates method 450 for processing messages received from a server-side proxy according to an embodiment of the invention. In alternate embodiments, these steps may be executed in a different order, as there is no necessary synchronization or sequencing except where explicitly indicated.

Step 455 receives messages from the server-side proxy. Messages can be directed to the client-side proxy specifically or to the client application. In the latter case, the client-side proxy intercepts messages directed to the client application by the server or server-side proxy. Step 460 determines if the received message requests the invalidation of all or a portion of the results cache of the client-side proxy. If so, then in step 465, the client-side proxy discards or otherwise invalidates the data in the appropriate portion of its results cache. Following step 465, method 450 returns to step 455 to wait for additional messages from the server-side proxy.

Conversely, if step 460 determines that the message does not request the invalidation of any portion of the results cache, then step 470 determines if the message includes data to be cached. In an embodiment, messages including data to be cached can include one or more results messages corresponding with one or more prefetch messages issued by a server-side proxy on behalf of the client application. In a further embodiment, messages including data to be cached can include copies of prefetch messages or an identifier derived therefrom to facilitate matching received client request messages with corresponding result messages stored in the results cache.

If step 470 determines that the received message from the server-side network proxy includes data to be cached, step 475 adds the data from the messages to the results cache of the client-side network proxy. Conversely, if step 470 determines that the received message does not include data to be cached, then step 480 forwards to received message to its intended destination, such as the client application. Following step 480 or 475, method 450 returns to step 455 to wait for any additional messages.

Figure 5A:
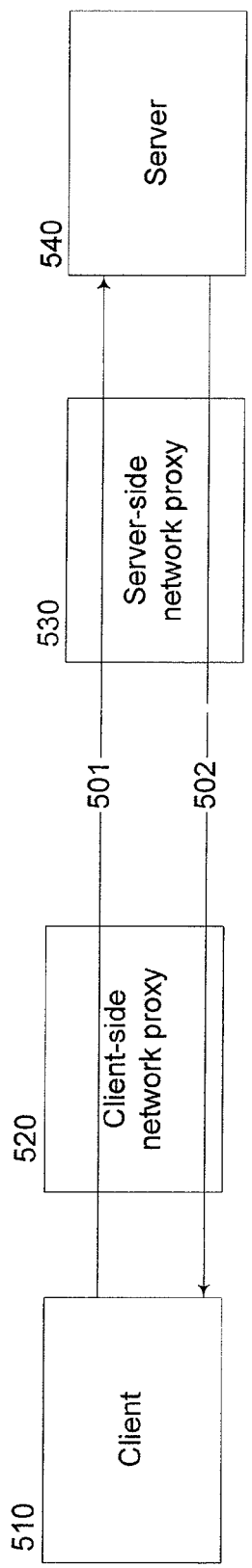
FIGS. 5A-5C show flows of messages between client-side proxy and server-side proxy according to an embodiment of the invention.
Figure 5B:
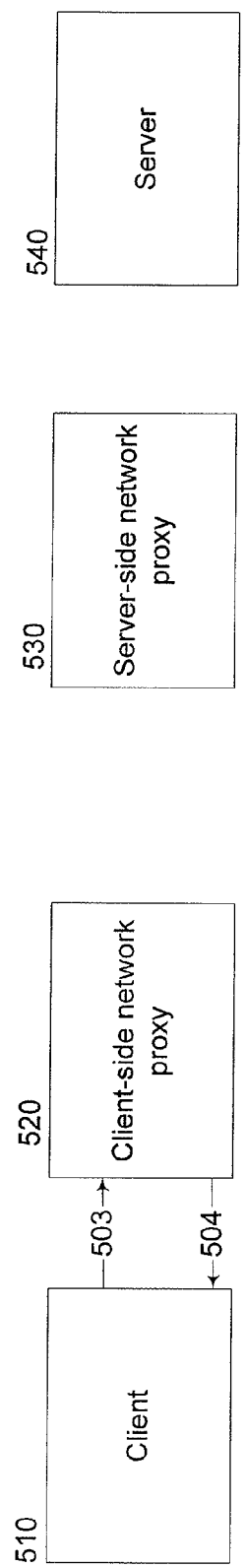
Figure 5C:
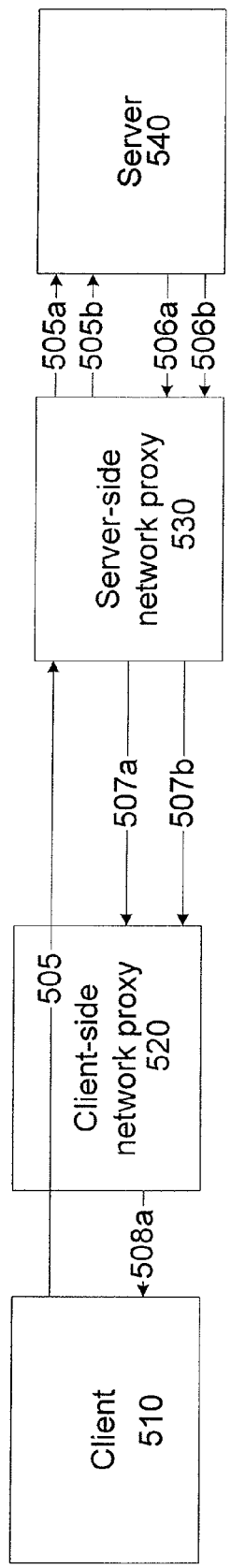

FIGS. 5A-5C show example message flows among elements of the system according to embodiments of the invention. FIG. 5A shows a simple flow of a client request message 501 from client application 510 through client-side network proxy 520 and server-side network proxy 530 to server application 540. The corresponding response message 502 passes from server application 540 through server-side network proxy 530 and client-side network proxy 520 to client application 510. In FIG. 5A, client-side network proxy 520 and server-side network proxy 530 are able to examine the client request message 501 and response message 502 but do not affect communication between client 510 and server 540.

FIG. 5B shows a flow of a client request message 503 from client application 510 to client-side network proxy 520. In this example, the client request message 503 corresponds with a cached response message in the results cache of the client-side proxy. Thus, client-side proxy 520 retrieves the response message 504 from its results cache and returns it to the client application 510. In this example, there is no need for any additional communications with other elements of the system.

FIG. 5C shows how prefetching takes place and thus how the client-side network proxy 520 would be able to deliver cached results as previously shown in FIG. 5B. Client request message 505 from client application 510 may be examined at client-side proxy 520 but in this example does not match any cached results. So client request message 505 is forwarded on to server-side proxy 530, where it is examined again. In this example, the client request message matches one or more rules, which trigger the server-side proxy 530 to produce messages 505a and 505b. In some embodiments, message 505a may be identical to request 505. In some embodiments, there may be more or fewer messages generated by server-side proxy 530; there is no significance to using two for this example. Messages 505a and 505b are sent to server 540, which produces corresponding result messages 506a and 506b. In one arrangement, 505a is the unmodified direct request 505 and so the corresponding result 506a is passed on as 507a to the client-side network proxy 520, then as 508a to the client 510. However, 505b is a prefetch message and so the corresponding result message 506b is marked as data to be cached and wrapped in message 507b. When result message 507b is sent to client-side network proxy 520, the content of 507b is placed in the result cache of client-side network proxy 520 and no corresponding message is sent to client 510.

FIG. 6 shows the elements of an example rule, such as might be used to set up rules in the rule store 260 described in FIG. 2. The example coded there captures the following case:

When the server-side proxy receives a message from a client that is the Microsoft Project product encoded in the TDS format, where the message is of type 3, has RPC ID 5, with 7 arguments, and the query portion of that message matches the regular expression below; then perform the following action:

Send a prefetch TDS message of type 3, rpc id 5, with the query string "select proj_read_count, proj_locked, proj_read_write, proj_read_only, proj_id, proj_machine_id, proj_data_source from msp_projects where proj*name*=<*the*_matched_sub_expression>"

Rule element 610 describes the matching part of the rule. Action element 620 describes the whole-message replacement action to be taken for a received message that matches the corresponding rule element 610. A rule element 610 can have multiple associated action elements 620, with each action element 620 producing a distinct whole-message replacement. Argument action element 630 describes an argument-level replacement whereas action element 620 describes a whole-message-level replacement. An action element 620 can have multiple associated argument action elements 630, with each argument action element 630 producing a distinct argument replacement.

The example rule of FIG. 6 is discussed for the purposes of illustration. Any number of rules with different types of rule and action elements can be employed by embodiments of the invention. Additionally, rules can be specified for different types and categories of client applications, different server applications, and different message formats and protocols. In general, embodiments of the invention are applicable to systems in which clients communicate with server applications using any type of request/reply protocol. For example, embodiments of the invention can be used in conjunction with any type of database server, Java RMI, and CORBA.

In a further embodiment, the systems and techniques for prefetching and caching as described above can be extended to preacknowledge client request messages. Preacknowledgment is the creation of synthetic responses to client request messages by a client-side or server-side network proxy or transaction accelerator to replace acknowledgement messages normally sent by servers to clients in response to client request messages. The use of preacknowledgment decreases the delay clients experience between sending a client request message and receiving an acknowledgment message from the server.

In some applications, preacknowledgment may not be safe from a data consistency perspective. Thus, in an embodiment, preacknowledgment is turned off in default configurations of network proxies and transactions accelerators. Preacknowledgment can then be selectively enabled only for specific types of transactions. In a further embodiment, the insertion of transaction boundaries around client request messages ensures data consistency safety.

In an embodiment, rules are used at the client side and/or server side proxy to determine if a request can be preacknowledged. In a first embodiment, a server side rule engine examines incoming client request messages to determine whether it is safe to respond with a preacknowledge message. In the case of a match between one or more server-side rules and a client request message, the server-side proxy sends an identifier, such as a statement id, handle, or other transaction identifying information, to the client-side proxy. This identifier is used to identify subsequent client request messages in the same or related transaction that can be preacknowledged by the client-side proxy or transaction accelerator.

In an embodiment, the client-side proxy or transaction accelerator uses the identifier alone or in conjunction with additional client-side rules to identify subsequent client request messages that can be safely preacknowledged. In response to identifying subsequent client request messages matching the identifier, the client-side proxy or transaction accelerator returns preacknowledgment messages to the client immediately.

In an example, preacknowledgment messages can be used when a client does not care about the results of a series of client request messages, such as a client uploading and repeatedly invoking an SQL procedure with different arguments, provided that the client request messages are received and processed by the server.

In another embodiment, client-side rules in a client-side proxy or transaction accelerator are used for requests that occur frequently in a transaction, but not consecutively. In an embodiment, the client-side proxy includes the capability to generate an identifier from incoming client request messages. In a further embodiment, the client-side proxy generates and stores identifiers for all incoming client request messages, including those that do not match a client-side rule and are not preacknowledged. This prevents client request messages that cannot be preacknowledged from being misidentified due to identifier collisions.

In a further embodiment, the client-side network proxy further ensures data consistency safety by inserting a transaction start point request before the first client request message that is being preacknowledged. The client-side proxy discards the server response to this transaction start-point request.

In yet a further embodiment, the server responses, including acknowledgement messages sent in response to client request messages are received by the client-side proxy. The client-side proxy examines the acknowledgment messages for success or failure codes. In the case of a success code for a client request message that has already been preacknowledged by the client-side proxy, the client-side proxy discards the response message as redundant. In the case of a failure code for a client request message that has already been preacknowledged by the client-side proxy, the next client request message in the same transaction that is received from the client receives an error response. Alternatively, the client-side proxy can tear down the connection in response to a failure code.

If all responses to client request messages indicate success and a non-preacknowledgable client request message is received, a transaction end point request is sent to the server side. On receipt of a successful response, the pending non-preacknowledgable request is proxied to the server side. An unsuccessful response results in a non-acknowledgment response being sent to the client or alternatively the client-side proxy tears down the connection.

In a further embodiment, a throttling mechanism can be used based on responses coming back to the client side proxy. The client side proxy would suspend the generation of preacknowledgment requests when the number of outstanding responses for preacknowledged requests exceeds a configurable threshold. This prevents a client from flooding the server due to the decreased delay between client request messages and preacknowledgment responses.

In an embodiment, to implement preacknowledgment, the client-side network proxy in FIG. 2 is augmented with optional match engine 240a and rule store 260a. Optional match engine 240a and rule store 260a are similar to the match engine 240 and rule store 260 discussed above, with the additional functionality as described with reference to preacknowledgment messages.

Figure 7:
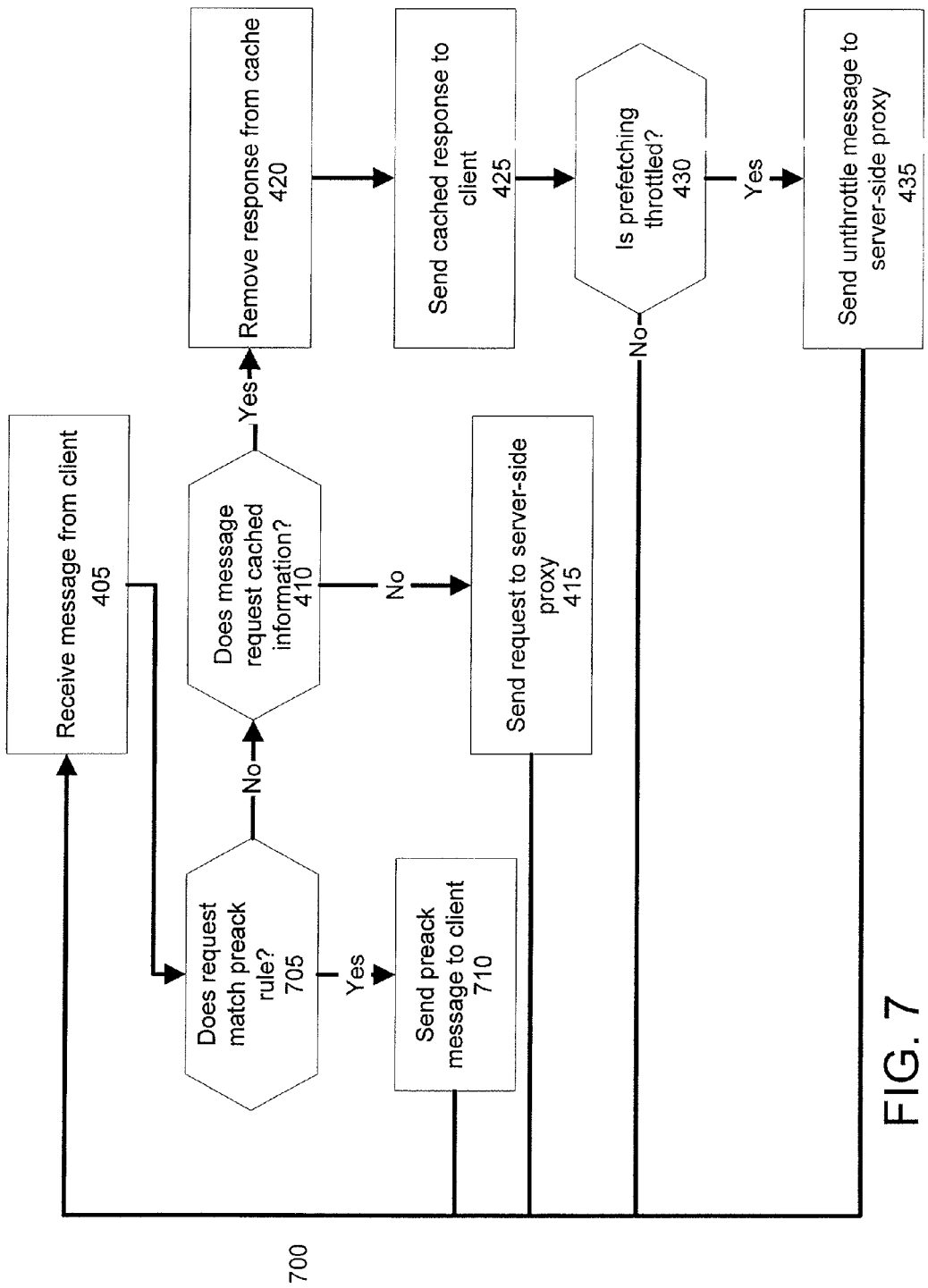
FIG. 7 shows a method of processing messages received from the server-side proxy according to an embodiment of the invention.

FIG. 7 illustrates a method 700 of processing messages received from the server-side proxy according to an embodiment of the invention. Method 700 is substantially similar to method 400 of FIG. 4A, with steps 405, 410, 415, 420, 425, 430, and 435 of method 700 behaving similarly to their like-numbered counterparts of method 400. However, following step 405, step 705 determines in a client request message matches a preacknowledgment rule. If not, then method 700 proceeds to step 410 and subsequent steps, as described above. If step 705 determines that the message does match a preacknowledgment rule, then step 710 generates and sends a preacknowledgment message back to the client. Following step 710, method 700 returns to step 405.

Although the invention has been discussed with respect to specific embodiments thereof, these embodiments are merely illustrative, and not restrictive, of the invention. Furthermore, the system architecture discussed above is for the purposes of illustration. The invention can be implemented in numerous different forms including as a stand-alone application or as a module integrated with other applications. Thus, the scope of the invention is to be determined solely by the claims.

What is claimed is:

1. A method for accelerating a client-server transaction, the method comprising:
   receiving, by a proxy, a message from a client application directed to a server application;
   determining, by the proxy, if the message is consistent with a previous message sent to the server application, wherein the message is consistent with the previous message if the message can be forwarded to the server application without introducing an error and wherein the previous message was generated by the proxy;
   sending the message to the server in response to a determination that the message is consistent with the previous message sent to the server application;
   comparing the message with the set of rules;
   generating at least one additional message in response to the message matching at least one rule, wherein the additional message is predicted by the proxy based on the set of rules;
   forwarding the additional message to the server application; and
   generating a preacknowledgment message and forwarding the preacknowledgment message to the client application in response to the determination that the message does not correspond with the data in the results cache.

2. The method of claim 1, wherein the previous message was generated by a server-side proxy in response to at least one additional previous message matching the set of rules.

3. The method of claim 1, further comprising:
   determining if the message is inconsistent with at least a portion of a results cache storing a results message corresponding with the previous message sent to the server application in response to a determination that the message is inconsistent with previous messages sent to the server application; and
   invalidating the portion of the results cache in response to a determination that the message is inconsistent with the portion of a results cache.

4. The method of claim 1, further comprising:
   receiving a second message from the server application;
   determining if the second message is a response to the additional message; and
   wrapping the second message to indicate that the second message is to be stored in a results cache included in a network proxy associated with the client application and forwarding the wrapped second message to the network proxy associated with the client application in response to a determination that the second message is a response to the additional message.

5. The method of claim 4, further comprising:
determining if the second message is a response to the message from the client application; and
forwarding the second message to the client application in response to a determination that the second message is a response to the message from the client application.

6. The method of claim 4, further comprising:
determining if the second message invalidates at least a portion of the results cache included in the network proxy associated with the client application; and
sending a cache invalidation message to the network proxy specifying that the portion of the results cache should be invalidated.

7. The method of claim 1 wherein the error can be introduced if the previous message was incorrectly predicted by the proxy, and wherein the error can include an unrecoverable transaction error due to an out-of-order or an unexpected request.

8. A method for accelerating a client-server transaction, the method comprising:
receiving a message from a client application directed to a server application;
determining if the message corresponds with data in a results cache;
sending the message to the server application in response to a determination that the message does not correspond with the data in the results cache;
generating a preacknowledgment message and forwarding the preacknowledgment message to the client application in response to the determination that the message does not correspond with the data in the results cache;
sending a response message to the client application in response to a determination that the message does correspond with at least a portion of the data in the results cache, wherein the response message includes at least a portion of the data from the results cache;
in response to sending the response message to the client application, removing data from the results cache that was included in the response message;
determining if the message is inconsistent with at least a portion of a results cache storing a results message corresponding with the previous message sent to the server application in response to a determination that the message is inconsistent with previous messages sent to the server application; and
invalidating the portion of the results cache in response to a determination that the message is inconsistent with the portion of a results cache.

9. The method of claim 8, further comprising:
receiving an acknowledgment message from the server application, wherein the acknowledgment message is a response to the message from the client application;
analyzing a status code of the acknowledgment message;
discarding the acknowledgment message in response to the status code indicating a success condition;
receiving a second message from the client application directed to the server application; and
forwarding a response message indicating a failure condition to the client application following the receipt of the second message from the client application in response to the status code of the acknowledgment message indicating a failure condition.

10. The method of claim 8, further comprising:
receiving a second message from a server-side proxy;
determining if the second message includes additional data prefetched by the server-side proxy or a response to the message from the client application;
storing the additional data in the results cache in response to a determination that the additional data was prefetched by the server-side proxy; and
sending the second message to the client application in response to a determination that the additional data is a response to the message from the client application.

11. The method of claim 10, further comprising:
determining a capacity for the results cache in response to receiving the second message;
sending a throttling message to the server-side proxy in response to a determination that the results cache is at full capacity.

12. The method of claim 11, further comprising:
removing at least a portion of the data from the results cache in response to sending the response message including at least a portion of the data from the results cache to the client application; and
sending an unthrottling message to the server-side proxy in response to removing at least a portion of the data from the results cache.

13. The method of claim 8, further comprising:
determining if the second message is a cache invalidation message; and
invalidating at least a portion of the results cache in response to a determination that the second message is a cache invalidation message.

14. The method of claim 8 wherein the data in the results cache includes data corresponding to one or more prefetch messages created based on previous messages received from the client application.

15. A network proxy adapted to accelerate a client-server transaction, the network proxy comprising:
a first network interface adapted to exchange messages with a client application;
a second network interface adapted to exchange messages with a server application;
a results cache adapted to store data including response messages prefetched on behalf of the client application; and
logic adapted to:
determine if a message received from a client application and directed to a server application corresponds with data in a results cache;
send the message to the server application in response to a determination that the message does not correspond with the data in the results cache;
generate a preacknowledgment message and forward the preacknowledgment message to the client application in response to the determination that the message does not correspond with the data in the results cache;
send the response message stored in the results cache to the client application in response to a determination that the message does correspond with at least a portion of the data in the results cache;
in response to sending the response message to the client application, remove data from the results cache that was included in the response message;
determine if the message is inconsistent with at least a portion of a results cache storing a results message corresponding with the previous message sent to the server application in response to a determination that the message is inconsistent with previous messages sent to the server application; and invalidate the portion of the results cache in response to a determination that the message is inconsistent with the portion of a results cache.

16. The network proxy of claim 15, further comprising logic adapted to:

receive a second message from a server-side proxy;

determine if the second message includes additional data prefetched by the server-side proxy or a response to a previous message from the client application;

store the additional data in the results cache in response to a determination that the additional data was prefetched by the server-side proxy; and send the second message to the client application in response to a determination that the additional data is a response to the previous message from the client application.

17. The network proxy of claim 15, further comprising logic adapted to:

receive an acknowledgment message from the server application, wherein the acknowledgment message is a response to the message received from the client application;

analyze a status code of the acknowledgment message;

discard the acknowledgment message in response to the status code indicating a success condition; and forward a response message indicating a failure condition to the client application following the receipt of a subsequent message from the client application in response to the status code of the acknowledgment message indicating a failure condition.

* * * * *